United States Patent [19]

DeRobert et al.

[11] Patent Number: 5,118,572
[45] Date of Patent: Jun. 2, 1992

[54] FILIFORM ELECTRODE WITH METAL COATING FOR SPARK EROSION

[75] Inventors: Pierre DeRobert, Geneva, Switzerland; Louis Lacourcelle, Groisy, France

[73] Assignee: Thermo Compact, société anonyme, Metz Tessy, France

[21] Appl. No.: 554,280

[22] Filed: Jul. 17, 1990

[30] Foreign Application Priority Data

Nov. 27, 1989 [FR] France ................. 89 16002

[51] Int. Cl.⁵ ............................. C25B 11/04
[52] U.S. Cl. ........................ 428/607; 428/674; 428/675; 204/290 R; 204/293
[58] Field of Search .............. 428/607, 674, 675; 204/290 R, 290 F, 293

[56] References Cited

U.S. PATENT DOCUMENTS

| | | | |
|---|---|---|---|
| 2,301,320 | 11/1942 | Phillips et al. | 428/675 |
| 4,033,837 | 7/1977 | Kuo et al. | 428/675 |
| 4,221,643 | 9/1980 | Miles et al. | 204/290 R |
| 4,631,237 | 12/1986 | Dommer et al. | 428/674 |

FOREIGN PATENT DOCUMENTS

| | | | |
|---|---|---|---|
| 185492 | 6/1986 | European Pat. Off. | |
| 181412 | 10/1984 | Japan | 428/675 |

Primary Examiner—George Wyszomierski
Attorney, Agent, or Firm—Ratner & Prestia

[57] ABSTRACT

A filiform electrode with metal coating for spark erosion is disclosed, formed of a metal wire comprising a metal copper or copper-zinc alloy core (15) coated with a metal coating (16) comprising a copper alloy deposit. The core (15) has a substantially constant and homogeneous composition throughout its whole cross section, as far as its connecting interface (17) with the coating.

6 Claims, 1 Drawing Sheet

FILIFORM ELECTRODE WITH METAL COATING FOR SPARK EROSION

BACKGROUND OF THE INVENTION

1. Field of the Invention

The present invention relates to wire-shaped electrodes which are used for machining workpieces by electro-erosion.

2. Description of the Prior Art

In such machining, described for example in the document FR-A-2 418 699, a wire-shaped electrode is driven along a path close to a metal workpiece to be machined. An electric generator produces a potential difference between the metal workpiece to be machined and the metal wire forming the electrode. A spark is produced in the machining zone between the wire forming the electrode and the metal workpiece, and progressively erodes the workpiece.

The rate of eroding the mechanical workpiece which can be obtained depends on a large number of parameters, particularly on the electric generator, the sparking distance and the machining fluid present in the sparking zone. However, it has been discovered that the rate of erosion also depends on the nature of the materials forming the wire-shaped electrode.

The document CH-A-646 083 mentions the possibility of forming a wire electrode for spark erosion by providing a good conducting core, made from steel or copper, coated with a zinc base alloy layer. The presence of zinc limits the surface temperature of the electrode during sparking, because zinc has a relatively low evaporation temperature. The result is less heating of the core in the sparking zone, which reduces the risks of breakage.

The document CH-A-646 083 also teaches the introduction, in the coating containing zinc, an amount of nickel whose effect is to increase the electric resistivity of the coating and so reduce its thermal conductivity. The result is that the coating thermally isolates the metal core in the sparking zone and reduces heating thereof, which also reduces the risks of breakage.

These known techniques, tending to reduce the risks of breakage, are however not sufficient for electro-erosion wires whose diameter is small, for example less than 0.30 mm. For small diameters, it has in fact been discovered that the tendency to breakage of the wires increases substantially apparently more than the reduction of diameter.

Now modern electro-erosion techniques, particularly for obtaining high machining precision, require the use of filiform electrodes whose diameter is the smallest possible.

From these observations, the present invention proposes forming a filiform electrode for electro-erosion with which the risks of breakage are substantially reduced, substantially increasing the rate and precision of erosion of a metal workpiece, the other electro-erosion parameters being kept constant.

The problem which the invention attempts to solve is to increase the electric conductivity of the core coated with a metal coating, preferably a coating containing a proportion of zinc, so as to reduce heating of the core due to the passage of the electric current in the core as far as the sparking zone.

It is in fact apparent that, with the filiform electrodes obtained by the methods described in the above documents, the electric conductivity of the core is deteriorated during formation of the coating, and such deterioration is all the greater when the core has a relatively small diameter, i.e. when the electrode has a diameter less than 0.30 mm.

The invention resides particularly in the fact of having demonstrated that the breakage of electrodes with a metal core covered with a zinc based coating obtained by known processes, result from the degradation of the electric conductivity of the core during formation of the coating.

SUMMARY OF THE INVENTION

The object of the invention is to provide a new wire electrode structure and a method for forming same, in which the metal core is a good conductor of electricity, and its conductivity is not reduced by the presence of the zinc or other metal based peripheral coating. According to the invention, the coating is formed about a good electrically conducting core without damaging the core, and without requiring an intermediate protective layer.

In another aspect of the invention, the filiform electrode must allow machining to be carried out by spark erosion producing surface conditions which are the most regular possible on the machined workpiece.

For that, the invention results from the following observation: during electro-erosion, drops of molten metal remain temporarily attached to the electrode, then are detached from the electrode in the sparking zone. The presence of the molten metal drops on the electrode in the sparking zone modifies the geometry of the electrode and also modifies the sparking conditions. These modifications introduce irregularities, depending on the irregular production of molten metal drops and induce surface irregularities of the machined workpiece.

From this observation, the invention proposes improving the machined surface quality obtained by promoting the removal of the molten metal drops, preventing them from remaining attached to the electrode in the sparking zone.

In another aspect of the invention, the filiform electrode comprises a coating whose structure further reduces heating of the core in the sparking zone.

Another object of the invention is to provide a method of producing such a wire-shaped electrode, this method making it possible to control very accurately the different parameters of the electrode. In particular, the electrode according to the invention is formed of a metal core wire, the core wire being covered with a surface electrolytic deposit of copper alloy. The method allows the thickness of the surface electrolytic alloy deposit, the proportion of metal accompanying the copper of this surface electrolytic alloy deposit and the composition and structure of the alloy in the thickness of the electrolytic deposit to be controlled very efficiently and accurately. This composition and this structure may be modulated as desired in the thickness of the electrolytic deposit.

In another aspect of the invention, the method allows a surface electrolytic alloy deposit to be obtained having a proportion of metal accompanying the copper less than 50% by weight. It has been discovered that known methods of forming metal electrodes for electro-erosion do not allow such a proportion of accompanying metal, such as zinc, in the surface layer of the electrode.

According to another aspect of the invention, the method allows a multi-layer coating formed of a stack of several very fine layers to be obtained simply.

To attain these objects as well as others, the present invention uses, for electro-erosion, an electrode formed by a metal wire comprising a metal core, the metal core being coated with a metal coating.

According to the invention, the metal core is made from copper or a copper alloy, so as to have optimum conductivity, associated with a sufficient mechanical strength; the metal core has a substantially constant and homogeneous composition over the whole of its cross section, as far as its connecting interface with the metal coating, the core being free of any zone of metal diffusion at the interface with the coating, and being free of any barrier or protective layer at the interface with the coating. The substantially constant and homogeneous composition of the core, over the whole cross section, guarantees optimum electric conductivity, despite the presence of a metal coating surrounding the core. The interface between the core and the coating is sharply defined. Preferably, the coating is formed by cold deposition, on a copper or copper alloy core, of at least one metal or alloy layer forming the final coating, excluding any subsequent heating operation likely to cause diffusion of the metals between the coating and the core. Thus, the method is distinguished from the methods used in the prior techniques for forming a zinc alloy based coating, in which prior methods a step is recommended for heating the electrode so as to ensure diffusion of the metal layers forming the coating in one another. In such a step, metal atoms forming the coating are diffused inside the core and substantially reduce its electric conductivity.

The coating comprises advantageously an electrolytic deposition of copper alloy and metal accompanying the copper.

Preferably, the proportion of metal accompanying the copper contained in the electrolytic deposit must be less than 50% by weight.

In one embodiment, the coating according to the invention comprises a surface layer formed of at least one of the metals from the group comprising iron, nickel, chromium and cobalt. This surface layer substantially reduces the adherence of the molten metal drops, which are rapidly detached from the coating in the sparking zone.

In an advantageous embodiment, the coating comprises several layers of different metals or alloys, able to combine with each other during fusion so as to form a common alloy. This characteristic is contrary to the teaching of the prior documents, which recommend a heating step for diffusing the coating layers in each other. Surprisingly, the invention reveals a substantial reduction of the risks of mechanical breakage of the filiform electrode having such a non diffused multi-layer coating. It is probable that the combination of the different layers forming the coating, so as to form a common alloy during fusion, tends to reduce heating of the core and so tends to reduce its risks of breakage.

BRIEF DESCRIPTION OF THE DRAWINGS

Other objects, features and advantages of the present invention will be clear from the following description of particular embodiments, with reference to the accompanying figures in which.

DESCRIPTION OF THE PREFERRED EMBODIMENTS

Figure 1:
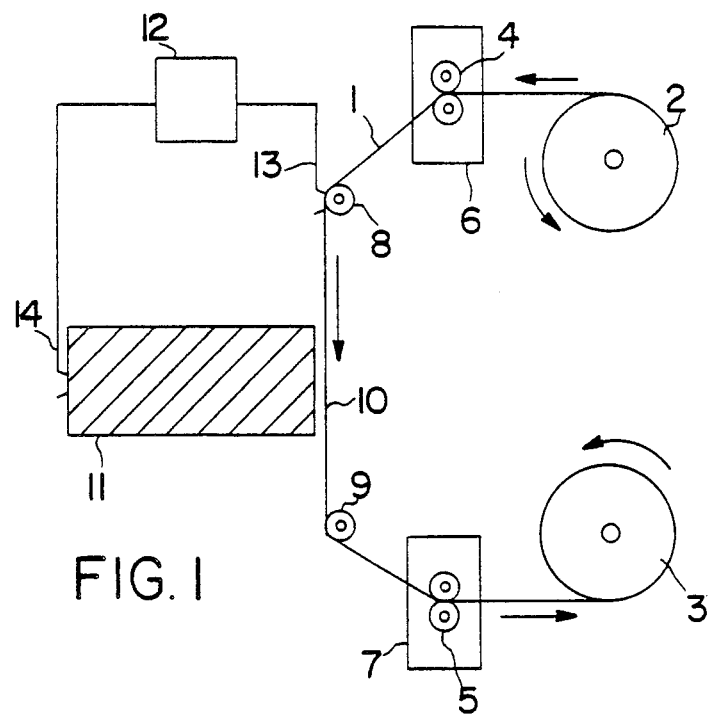
FIG. 1 shows schematically an electro-erosion installation using an electrode according to the present invention.

As shown in FIG. 1, an electro-erosion installation with wire-shaped electrode generally comprises a wire electrode 1 which is moved along a predetermined path. The wire electrode 1 is paid out from a wire reserve 2 and is recovered on a take-up reel 3 after machining. Between reserve 2 and the take-up reel 3, the electrode 1 follows a path shown schematically, during which it is driven by drive rollers 4 and 5 driven by motors 6 and 7, and is guided by guide members such as rollers 8 and 9. Between rollers 8 and 9, the electrode 1 passes through the machining zone 10, in which it is opposite a workpiece 11 to be machined. An electric pulse generator 12 is connected by appropriate electrodes 13 and 14 between the wire electrode and the workpiece to be machined 11. The electric pulses produced by the electric pulse generator 12 produce sparking in the machining zone 10, between the workpiece to be machined 11 and electrode 1. Such sparking causes progressive erosion of workpiece 11, which erosion may be continued as desired by relative movement of workpiece 11 and the electrode portion 1 between rollers 8 and 9.

Figure 2:
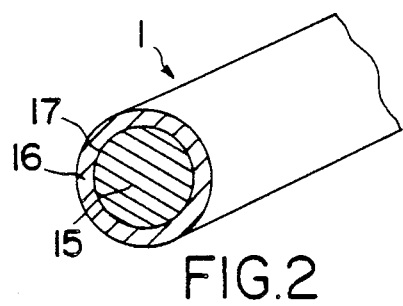
FIG. 2 shows schematically in cross section an electrode according to the invention.

In FIG. 2 has been shown, on a larger scale, the wire electrode 1 according to the present invention. The electrode comprises a metal core 15, advantageously formed of copper or a copper-zinc alloy, or any other appropriate metal, which is a good conductor of electricity and has sufficient mechanical strength. The metal core 15 is coated with a metal coating 16. The two layers formed by core 15 and coating 16 being in contact with each other at a sharply defined interface 17. Throughout the whole of its cross section, as far as the connecting interface 17 with the metal coating, core 15 is free of any zone of diffusion of the metals forming coating 16. Coating 16 is advantageously formed from an electrolytic copper alloy.

Coating 16 advantageously contains zinc, whose presence reduces heating of the core in the sparking zone.

Coating 16 may also advantageously contain nickel, and be formed for example of a ternary alloy of copper, zinc and nickel or a copper and nickel alloy.

Figure 3:
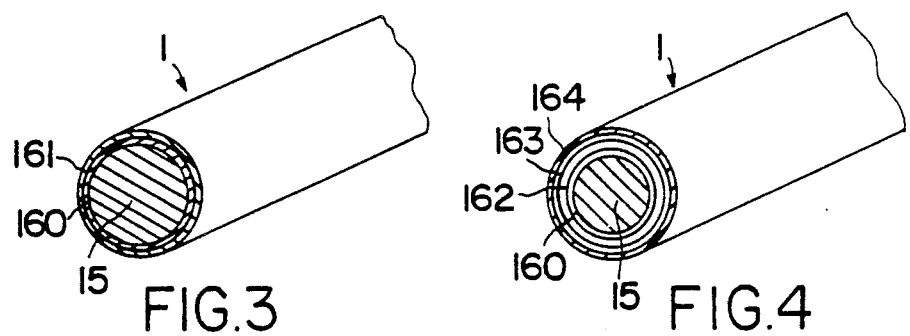
FIG. 3 shows schematically in cross section an electrode according to another embodiment of the invention.
Figure 4:
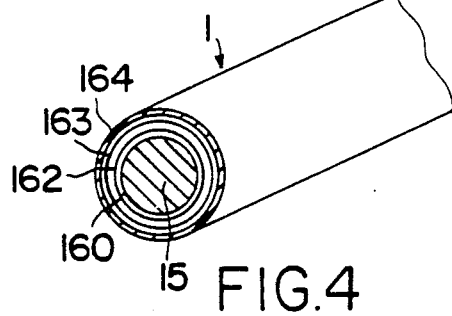
FIG. 4 shows schematically in cross section an electrode according to a third embodiment of the invention.

In the embodiment shown in FIG. 3, the coating of the invention comprises an inner layer 160 made from a copper based alloy, for example a layer similar to layer 16 of the embodiment of FIG. 2, surrounded by a surface layer 161 formed of one at least of the metals from the group comprising iron, nickel, cobalt, chromium. The surface layer 161 may be very thin, its thickness being for example about 1 micron. In the embodiment of FIG. 4, coating 16 comprises a plurality of different metal or alloy layers able to combine with each other at the time of sparking so as to form a common alloy. For example, a first internal layer 160 may be used formed of a copper and nickel alloy, a second copper layer 162, a third zinc layer 163, and a fourth layer 164 made from another metal or alloy.

In the embodiment shown in FIG. 4, the surface layer 164 may be formed by layer 161 of the embodiment of FIG. 3, from iron, nickel, cobalt or chromium.

To obtain a filiform electrode according to the invention, a method must be used of cold coating a core 15 with copper or copper alloy which is a good conductor of electricity. The coating is formed by cold deposition of at least one metal or alloy layer forming the final coating, and any subsequent operation of heating the electrode must be avoided. The designation "cold deposition" means that the deposition is made at a sufficiently low temperature for diffusion of metals from one layer to the other of the core or coating to be negligible. Such is the case of a deposition taking place at a temperature less than 100° C.

An improvement of the results has been discovered in the case where the proportion of metal accompanying the copper contained in the coating 16 is less than 50% by weight of the coating.

The coating may be formed by chemical deposition, or by electrolytic deposition. Electrolytic deposition may be preferred in particular in the embodiments in which it is desired to control the composition of the coating.

Thus, to form such an electrode as shown in FIG. 2, a core wire 15, made for example from copper or a copper-zinc alloy may be advantageously passed through a galvanoplasty bath to produce the surface electrolytic deposit 16 of copper alloy, with appropriate thickness and content of metal accompanying the copper.

A first possibility consists in depositing directly a copper-zinc alloy.

Another possibility is to form a co-deposition of two copper and zinc metals on core 15.

In an advantageous variant of the method of the invention, during the step for forming the surface electrolytic alloy deposit on core 15, the electric parameters of the galvanoplasty operation are varied appropriately as a function of time. Such variations induce a modulation in the composition and in the structure of the alloy deposit in the thickness of the coating.

In particular, a pulsed electric current may be advantageously passed through the galvanoplasty bath, between the electrodes. The composition and the structure of the alloy deposition may be modulated by adjusting the waveform parameters, such as frequency and cyclic ratio of the pulsed electric current.

In an advantageous embodiment of the invention, a coating may be formed of a stack of different metal or alloy layers. The layers are intended to combine with each other during the electro-erosive spark. To increase the rate of combination of the layers during sparking, the number of layers forming the coating may be increased and their thickness simultaneously decreased. The invention facilitates the formation of such a multilayer coating with numerous fine layers. In fact, displacement chemical deposition, which is the type of chemical deposition appropriate for depositing the types of metals or alloys forming the coating according to the invention, does not make it possible alone to form layers whose thickness is greater than 1 micron. Furthermore, the use of electrolytic deposition is more complex.

The invention overcomes these difficulties by forming the coating by a succession of electrolytic deposits and chemical deposits made alternately. Thus, a first layer two microns thick is formed for example by electrolytic deposition, by passing through an electrolytic bath; then a displacement of a portion of the metal of the first layer is caused and it is replaced by a second different layer of a maximum thickness of 1 micron; similarly, a third layer is formed by electrolytic deposition, then a fourth layer by chemical deposition, and so on.

A subsequent dimensioning step may also be used, by passing the electrode through a die. Thus, an electrode is obtained of a perfectly defined diameter.

The present invention is not limited to the embodiments which have been explicitly described, but includes the different variants and generalizations thereof contained within the scope of the following claims.

We claim:

1. A wire-shaped electrode for machining by spark erosion, comprising a metal core made from copper or a copper-based alloy with a metal coating, wherein the coating comprises at least two layers of different metals or alloys able to combine with each other during machining by spark erosion so as to form a common alloy.

2. A wire-shaped electrode according to claim 1, wherein said core has a diameter of less than 0.3 millimeters.

3. A wire electrode for spark-eroding systems for cutting of work pieces by eroding using electric pulses in a sparking zone, including a core of current-conducting material made from copper or a copper-based alloy and a wire coating of a material having a lower evaporation temperature, wherein:

the metal core has a substantially constant and homogeneous composition over the whole of its cross section, between the center of the core and its connecting interface with the metal coating, said core having a diameter sufficiently small for use in spark erosion, the core being free of any zone of metal diffusion at the interface with the coating, the electrode is free of any barrier at the interface between the metal core and the metal coating, wherein said metal coating comprises at least two distinct layers of different metals or alloys able to combine with each other during fusion in the sparking zone as to form a common alloy.

4. A wire electrode for spark-eroding systems for cutting of work pieces by eroding using electric pulses, including a core of current-conducting material with a metal coating of a material having a lower evaporation temperature, said metal coating comprising nickel, wherein:

the core has a substantially constant and homogeneous composition over the whole of its cross section, between the center of the core and its connecting interface with the metal coating, said core having a diameter sufficiently small for use in spark erosion, the core being free of any zone of metal diffusion at the interface with the coating, the electrode is free of any barrier at the interface between the core and the metal coating.

5. A wire electrode for spark-eroding systems for cutting of work pieces by eroding using electric pulses, including a core of current-conducting material with a metal coating comprising an electrolytic deposit of copper alloy and nickel accompanying the copper, wherein:

the core has a substantially constant and homogeneous composition over the whole of its cross section, between the center of the core and its connecting interface with the metal coating, said core having a diameter sufficiently small for use in spark erosion, the core being free of any zone of metal diffusion at the interface with the coating, the electrode is free of any barrier at the interface between the core and the metal coating.

6. A wire electrode for spark-eroding systems for cutting of work pieces by eroding using electric pulses, wherein said wire electrode during spark erosion is capable of producing sparks which melt a metal coating producing molten metal drops, including a core of current-conducting material and said metal coating comprising an electrolytic deposit of copper alloy and a surface layer formed of at least one of the metals from the group consisting of iron, nickel, cobalt and chromium, reducing the adherence of the molten metal drops on the coating, accompanying the copper, wherein:

the core has a substantially constant and homogeneous composition over the whole of its cross section, between the center of the core and its connecting interface with the metal coating, said core having a diameter sufficiently small for use in spark erosion, the core being free of any zone of metal diffusion at the interface with the coating, the electrode is free of any barrier at the interface between the metal core and the metal coating.

* * * * *